Sept. 20, 1955  J. MORKOSKI  2,718,184
DISK PLOW

Filed July 31, 1951  2 Sheets-Sheet 1

Inventor:
James Morkoski
By: Paul O. Pippel
Attorney.

Sept. 20, 1955  J. MORKOSKI  2,718,184
DISK PLOW
Filed July 31, 1951  2 Sheets-Sheet 2

Inventor:
James Morkoski
By: Paul O Pippel
Attorney.

United States Patent Office 2,718,184
Patented Sept. 20, 1955

2,718,184

DISK PLOW

James Morkoski, Memphis, Tenn., assignor to International Harvester Company, a corporation of New Jersey Application July 31, 1951, Serial No. 239,431

3 Claims. (Cl. 97—47.1)

This invention relates to agricultural implements and particularly to disk plows and the like. More specifically the invention concerns a supporting mechanism by which the front furrow wheel of an implement of this type is mounted upon the plow frame for raising and lowering the implement.

A disk implement such as a disk plow, in connection with which this invention is to be described, comprises generally an elongated framework in the form of a tool beam adapted to be propelled over the ground by a tractor and arranged to travel diagonally of the direction of movement of the tractor. A plurality of disks are suspended from the frame and arranged at spaced locations thereon. A plow of this type is provided with a draft frame connected to the forward end of the tool beam for attachment to the propelling vehicle, and the rear end of the frame is supported upon a wheeled truck customarily comprising laterally spaced wheels, one at each side of the beam, one of which is a land wheel and the other a rear furrow wheel adapted to travel in the furrow made by the disks. The front end of the beam is likewise supported upon a furrow wheel which travels in the previously made furrow and forms with the rear truck a triangular supporting arrangement. The draft frame is capable of lateral swinging relative to the implement and tractor to permit the implement to follow in the path of the tractor, and the movement of the draft frame is imparted to the front furrow wheel by the provision of a connecting link therebetween. In the conventional type of mounting for a front furrow wheel upon the plow frame, it is customary to provide a vertical axle mounted in a bearing on the frame having a wheel at its lower end and lifting linkage at its other end for sliding the axle vertically in this bearing to raise and lower the front end of the frame. This motion is likewise transmitted to the rear truck. The vertical type of axle support for the front furrow wheel has a number of disadvantages, among which is the complicated linkage required to hold the axle in an adjusted position and to raise and lower it with respect to its bearing. Another is the poor wearing qualities of such a supporting arrangement, the angle assumed by the frame in its various positions causing binding of the axle in its bearing.

It is an object of this invention to provide an improved supporting structure for the front furrow wheel of an implement such as the disk plow.

Another object of the invention is the provision of improved lifting and lowering mechanism for the front end of a trail-behind disk plow or the like.

Another object of the invention is the provision of a novel mounting for the front furrow wheel of a disk plow or the like wherein the furrow wheel rises in a vertical plane on a line with the front end of the plow frame about an axis in advance of the front end of the frame.

Other objects and advantages of the invention will become clear from the following detailed description when read in conjunction with the accompanying drawings, wherein.

Figure 1:
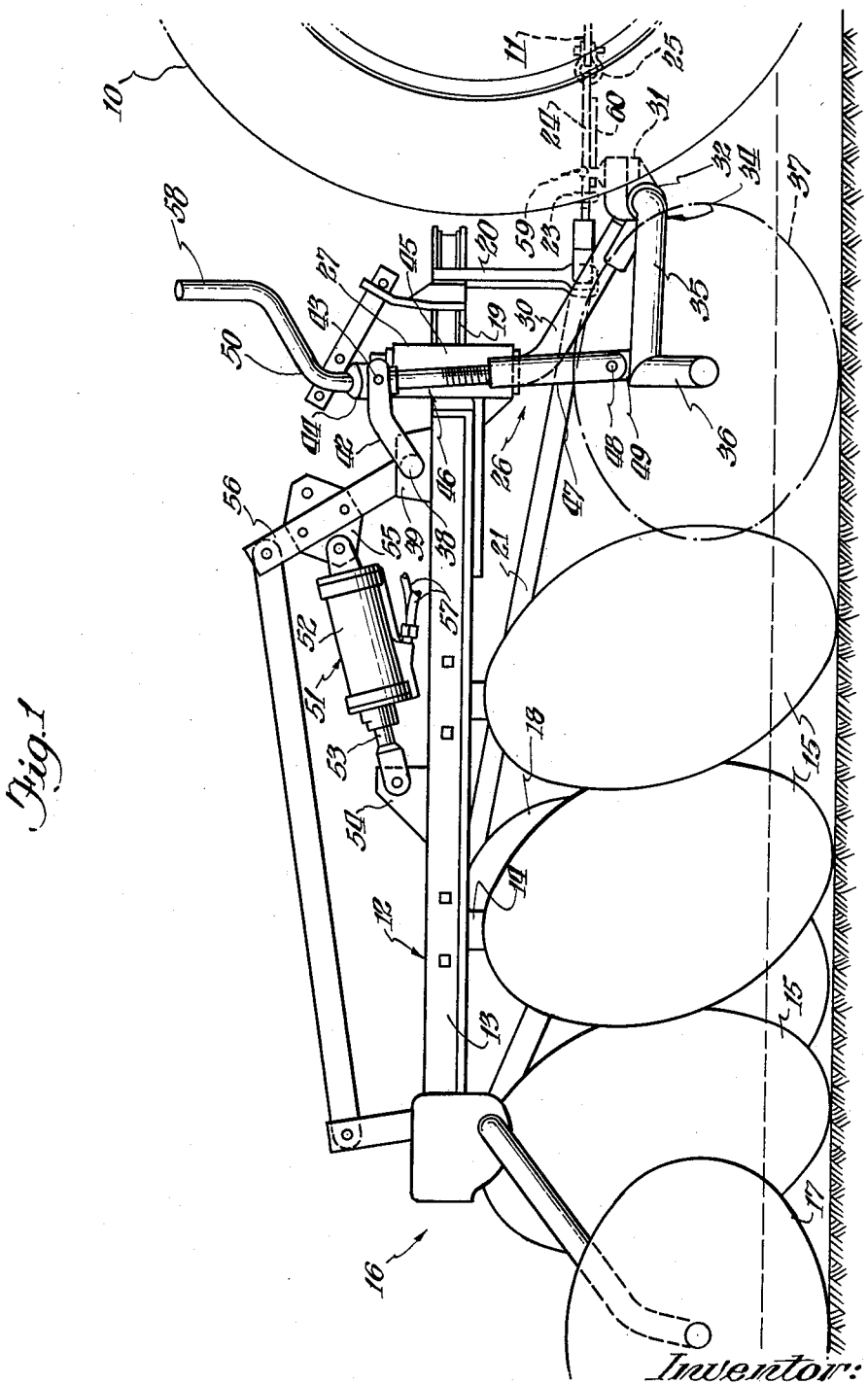
Figure 1 is a view in side elevation of a disk plow embodying the features of this invention attached to the draw bar of a tractor to be propelled thereby.

Referring to the drawings, the disk plow of this invention is shown connected to a tractor having laterally spaced rear drive wheels 10, only one of which is shown, and a draw bar 11. The general frame construction of the plow is more or less conventional and comprises an elongated transversely extending tool beam or frame 12 in the form of a pair of laterally spaced angle bars 13 adapted to receive therebetween at spaced locations depending standards 14 having mounted thereupon earth penetrating disks 15. The rear end of the disk carrying supporting frame 12 is mounted upon a wheeled truck generally designated at 16 and including a rear furrow wheel 17 and a land wheel 18 on opposite sides of the tool frame.

Secured to the forward end of the tool beam is a laterally extending bar 19 from which is suspended a bracket 20 having an opening at its lower end to receive for sliding movement a draft bar 21, the forward end of which is provided with a clevis 22 pivotally connected by a vertically extending pin 23 with a draft bar 24 connected by a clevis 25 with the tractor draw bar 11. The rear end of the bar 21 is suitably connected to the supporting frame 12. The forward end of the plow frame is carried upon a front furrow wheel supporting structure generally designated at 26 which includes a vertically extending bearing member 27 affixed to the forward end of the tool carrying beam and having rotatably mounted therein the vertically extending portion 28 of a spindle 29 having a lower forwardly bent portion 30 which extends forwardly from and terminates at a location well in advance of the forward end of the frame 12. There is secured to the forward end of the portion 30 of the spindle a casting 31 having incorporated therein a transversely extending bearing portion 32 adapted to receive for rotation therein the transverse portion 33 of a crank axle 34 having a rearwardly extending crank arm 35 bent at its rear end to form an axle portion 36 upon which is journaled a front furrow wheel 37. The axle portion 36 at the rear end of arm 35 is substantially in transverse alignment with the vertical portion 28 of spindle 29, and it will be noted that the crank axle with the furrow wheel 37 carried at the end thereof is capable of vertical swinging movement about the axle portion 33 of the crank as an axis.

Figure 2:
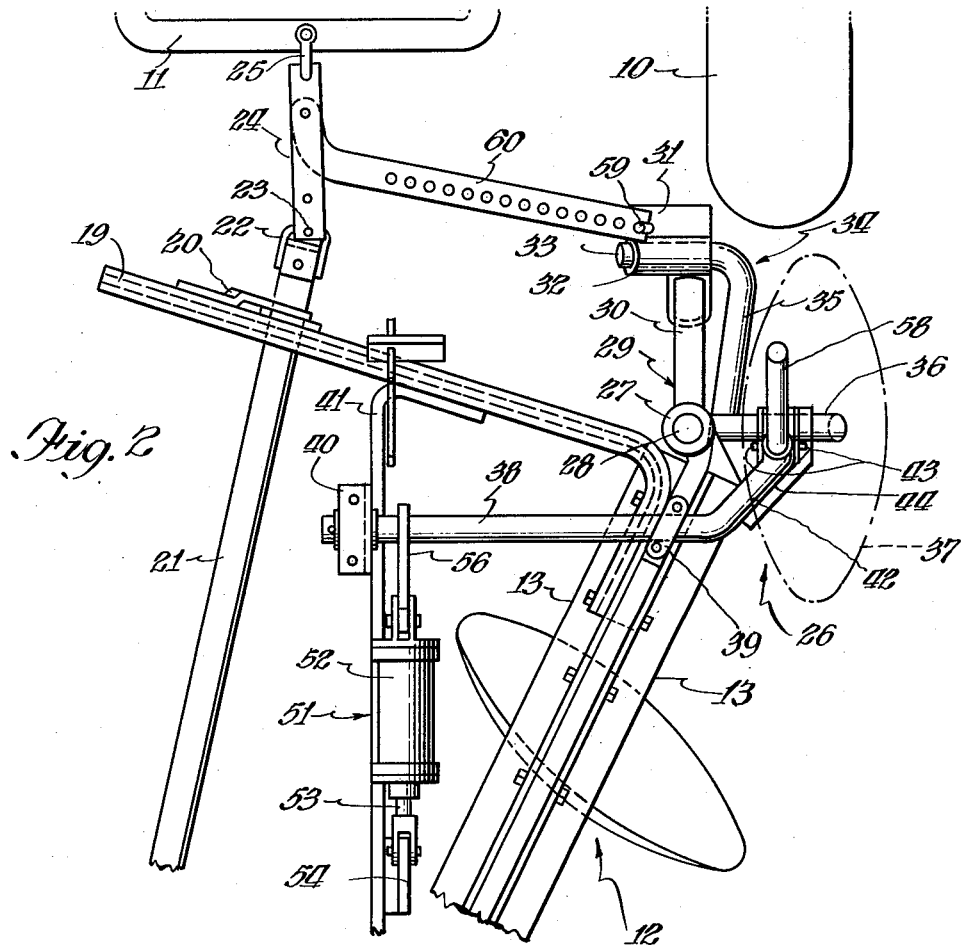
Figure 2 is a plan view of a portion of the disk plow shown in Figure 1.
Figure 3:
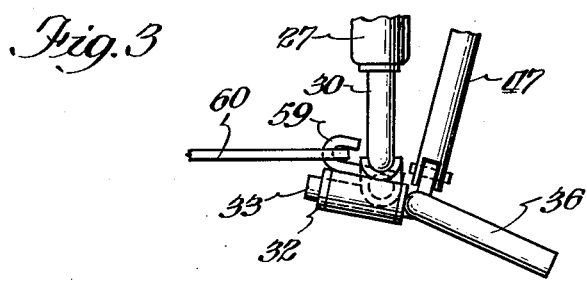
Figure 3 is a detail in rear elevation of a portion of the front furrow wheel supporting structure for the disk plow.

In order to raise and lower the front furrow wheel 37 about its axis in front of the tool carrying frame, there is provided a transversely extending rock shaft 38 rotatably carried in a bracket 39 mounted between the angle bars 13 and a bearing 40 secured to a bracing member 41 attached at its forward end to the transverse bar 19 and at its rear end to the beam 12. The right-hand end of the rock shaft 38, as viewed in Figure 2, is bent forwardly to form a rock arm 42 which is bifurcated at its end to pivotally receive a pair of trunnions 43 projecting laterally from a sleeve member 44 in which is pivotally mounted an extensible member generally indicated at 46 and including a threaded sleeve member 47 pivotally connected at 48 to a lug 49 secured to and projecting upwardly from the rear end of the crank arm 35. An adjusting screw 50 extends through the sleeve 44 and is threaded for reception in the threaded member 47.

Power for vertically swinging the crank arm 35 and the furrow wheel 37 is provided by a hydraulic ram unit 51 comprising a cylinder 52 and a piston rod 53, the latter being anchored to a lug 54 mounted upon the cross brace 41. The cylinder is anchored to a lug 55 carried upon a rock arm 56 affixed to the rock shaft 38. Fluid under pressure is supplied to the cylinder 52 to extend and retract the piston rod 53 therein, through hose lines 57 which extend in a manner well known in the art to the propelling vehicle and, is under the control of the operator of the tractor. Extension and retraction of the piston rod 53 in the cylinder 52 rock the shaft 38 to vertically swing the arm 42 and, through the extensible link 46, the axle 36 and wheel 37. Minor adjustments in the vertical position of the wheel 37 relative to the frame 12 are effected by manipulating the handle 58 of the extensible member 46 to vertically move the wheel 37 independently of operation of the ram unit 51.

A hook 59 mounted upon the casting 31 has connected thereto one end of a transversely extending steering bar 60, the other end of which is connected to the member 24. Thus upon lateral swinging of the implement relative to the tractor and to the member 24, the steering bar 60 swings the entire front furrow wheel unit about the axis of the spindle portion 28 in the bearing 27. Steering of the wheel 37 is accommodated by the provision of loose connections of the upper end of extensible member 46 with the rock arm 42 and of the lower end of the member with the lug 49.

The front furrow wheel supporting structure of this invention should be clearly understood from the foregoing description. It should further be understood that modifications may be made in the invention without departing from the spirit thereof or the scope of the appended claims.

What is claimed is:

1. In a trail-behind disk plow or the like having an elongated diagonally arranged disk-carrying frame, a wheel supported truck at its rear end and a forward laterally swingable draft frame, a front end support for the frame comprising a vertical bearing carried by the frame at the front end thereof, a spindle having a vertical portion receivable in the bearing and a forwardly bent lower portion, a transverse bearing carried at the end of said bent portion at a location longitudinally spaced from the vertical portion of said spindle, a crank axle having a portion rotatably receivable in said transverse bearing and a wheel-carrying crank portion substantially equal in length to the radial length of the forwardly bent portion of said spindle and extending rearwardly with the axis of the wheel lying substantially in a transverse plane through the vertical portion of said spindle, whereby the vertical movement of said wheel is on an arc in transverse alignment with said vertical portion of said spindle, means for vertically swinging said crank axle about its axis to raise and lower the front end of the plow frame, comprising a transverse rock shaft carried on the frame and having a rock arm thereon, a lifting link pivotally connected to said arm and extending vertically in substantially the same transverse plane as said vertical bearing, and power transmission means on the plow frame connected to said rock shaft for rocking the latter.

2. The invention defined in claim 1, further characterized by the fact that the said lifting link constitutes a member adjustable in length for effecting minor variations in the vertical position of the front furrow wheel relative to the disk-carrying frame independently of the power transmission means.

3. In a trail-behind disk plow or the like having an elongated diagonally arranged disk-carrying frame, a wheel supported truck at its rear end and a forward laterally swingable draft frame, a front end support for the frame comprising a vertical bearing carried by the frame at the front end thereof, a spindle having a vertical portion receivable in the bearing and a forwardly bent lower portion, a transverse bearing carried at the end of said bent portion at a location longitudinally spaced from the vertical portion of said spindle, a crank axle having a portion rotatably receivable in said transverse bearing and a wheel-carrying crank portion substantially equal in length to the radial length of the forwardly bent portion of said spindle and extending rearwardly with the axis of the wheel lying substantially in a transverse plane through the vertical portion of said spindle, whereby the vertical movement of said wheel is on an arc in transverse alignment with said vertical portion of said spindle, a rock arm mounted on the plow frame, a lifting link having its upper end pivotally connected to said arm and its lower end pivoted to said crank axle for raising and lowering the wheel upon rocking of said rock arm, and a steering connection between the draft frame and the forwardly bent end of said spindle for swinging the latter about its axis in response to lateral swinging of the draft frame, the connections of the lifting link to the crank axle being sufficiently loose to accommodate lateral swinging of the wheel with the spindle as a unit.

References Cited in the file of this patent
UNITED STATES PATENTS

| | | |
|---|---|---|
| 759,489 | Weeks | May 10, 1904 |
| 819,737 | Danielsen | May 8, 1906 |
| 1,196,222 | Esping | Aug. 29, 1916 |
| 2,392,006 | Silver | Jan. 1, 1946 |